United States Patent [19]
Akkermans et al.

[11] Patent Number: 5,488,517
[45] Date of Patent: Jan. 30, 1996

[54] SYSTEM COMPRISING A MAGNETIC-TAPE CASSETTE AND A MAGNETIC-TAPE APPARATUS, AND MAGNETIC-TAPE CASSETTE, TAPE-CLEANING MEANS AND TAPE-CLEANING ELEMENT FOR USE IN THE SYSTEM

[75] Inventors: Gerardus W. A. Akkermans, Breda; Augustinus L. Braun; Sander J. Klerk, both of Eindhoven, all of Netherlands

[73] Assignee: U.S. Philips Corporation, New York, N.Y.

[21] Appl. No.: 131,506

[22] Filed: Oct. 4, 1993

[30] Foreign Application Priority Data

Oct. 8, 1992 [EP] European Pat. Off. ............. 92203093

[51] Int. Cl.⁶ .......................... G11B 5/09; G11B 23/02
[52] U.S. Cl. .............................................. 360/53; 360/132
[58] Field of Search ...................... 360/132, 137, 360/128, 130.2, 53, 46, 64, 77.16, 134; 15/DIG. 12, DIG. 13

[56] References Cited

U.S. PATENT DOCUMENTS

| | | | |
|---|---|---|---|
| 3,731,289 | 5/1973 | Bajgert et al. | 310/174.1 R |
| 5,081,555 | 1/1992 | Rohloff | 360/128 X |
| 5,124,353 | 6/1992 | Kashida et al. | 360/64 X |
| 5,200,864 | 4/1993 | Dunn et al. | 360/48 |
| 5,260,840 | 11/1993 | Hatanaka et al. | 360/19.1 X |
| 5,274,515 | 12/1993 | Furuyama | 360/77.16 |
| 5,347,407 | 9/1994 | Solhjell et al. | 360/53 |

FOREIGN PATENT DOCUMENTS

| | | | |
|---|---|---|---|
| 111192 | 5/1992 | Australia | 360/59 |
| 0437865 | 7/1991 | European Pat. Off. | 360/51 |
| 2714765 | 10/1977 | Germany. | |
| 1552270 | 4/1977 | United Kingdom. | |

*Primary Examiner*—Donald Hajec
*Assistant Examiner*—Thien Minh Le
*Attorney, Agent, or Firm*—Brian J. Wieghaus

[57] ABSTRACT

A system including a magnetic-tape cassette and a magnetic-tape apparatus for recording and/or reproducing information in digital form on/from a magnetic tape. The information is stored in a plurality of parallel longitudinal tracks on the magnetic tape in successive information blocks in the longitudinal direction of the magnetic tape. The tape apparatus includes an error correction device for correcting read errors in the digital information read from the magnetic tape. The error-correction device is capable of correcting a maximum number of n successive information blocks on the magnetic tape. The magnetic-tape cassette has at least one tape-cleaning element having an active surface in contact with a coating side of the magnetic tape and, in a direction parallel to the longitudinal axis of the magnetic tape, has a dimension smaller than the overall longitudinal dimension of two times n information blocks. As a result, the error correction device is capable of at least substantially correcting read errors which occur as a result of soiling of the magnetic tape by the tape-cleaning element.

22 Claims, 3 Drawing Sheets

SYSTEM COMPRISING A MAGNETIC-TAPE CASSETTE AND A MAGNETIC-TAPE APPARATUS, AND MAGNETIC-TAPE CASSETTE, TAPE-CLEANING MEANS AND TAPE-CLEANING ELEMENT FOR USE IN THE SYSTEM

BACKGROUND OF THE INVENTION

The invention relates to a system comprising a magnetic-tape cassette and a magnetic-tape apparatus having a magnetic head for recording and/or reproducing information in digital form on/from a magnetic tape accommodated in a housing of the magnetic-tape cassette, which magnetic-tape apparatus comprises error correction means for correcting errors in the digital information read from the magnetic tape, which information is stored on the magnetic tape in a plurality of parallel longitudinal tracks in successive information blocks in the longitudinal direction of the magnetic tape, which magnetic-tape apparatus includes error-correction means for the correction of read errors in the digital information read from the magnetic tape, the error-correction means being capable of correcting a maximum number of n successive information blocks on the magnetic tape, which magnetic-tape cassette has at least one tape-cleaning means arranged in the housing and comprising at least one tape-cleaning element having an active surface which at least in operation is in contact with a coating side of the magnetic tape.

Such a system is known, in particular as the Digital Compact Cassette System (DCC system). A magnetic-tape cassette comprising tape-cleaning means suitable for use in the DCC system is described in the non-prepublished Austrian Patent Application A-1111/92 (herewith incorporated by reference). The tape-cleaning means of the cassette described therein are situated near tape-guide rollers in the magnetic-tape cassette and the tape-cleaning elements are in contact with the magnetic tape, the magnetic tape being pressed against the guide surfaces of the tape-guide rollers. The tape-cleaning means ensure that dirt and dust particles which may settle on the coating side of the magnetic tape are removed from the magnetic tape as effectively as possible. The tape-cleaning elements at least partly absorb the dirt and dust particles from the active surfaces, which may subsequently soil the magnetic tape, which dirt and dust particles may give rise to read errors when the magnetic tape is scanned magnetically. Generally these read errors can be corrected in that an error correction system is used when information is read from the magnetic tape. The information is stored in information units which each comprise 32 successive information blocks arranged in a longitudinal track. However, there are limits to the percentage of the number of errors which is permissible within one information unit in order to allow the error correction system to correct the errors. In practice, it has been found that these limits are occasionally overstepped, which results in audible errors in the reproduction of sound.

SUMMARY OF THE INVENTION

It is one of the objects of the invention to provide a system of the type defined in the opening paragraph, which substantially reduces the likelihood of the occurrence of read errors leading to incorrigible faults. To this end, the system in accordance with the invention is characterised in that the dimension of the active surface of the tape-cleaning element in a direction parallel to the longitudinal axis of the magnetic tape is smaller than the overall longitudinal dimension of two times n information blocks, the error correction means being capable of at least substantially correcting read errors which occur as a result of soiling of the magnetic tape by the tape-cleaning element. It has been found that when the tape is stationary the dirt and dust particles present in the tape-cleaning element may stay behind on the coating side of the magnetic tape when the tape transport is started, so that the magnetic tape may become soiled over an area equal in size to the area of contact between the magnetic tape and the active surface of the tape-cleaning element. The number of errors in this area which may result from this soiling of the magnetic tape by the tape-cleaning element (in the worst case all the information at the location of this magnetic tape area may be incorrect is too large to be corrected by the error correction means without giving rise to audible errors. By reducing the size of the active surface in such a way that the number of errors which can be produced by said soiling in this area remains below the limit value of the number of corrigible errors, no more audible errors in the sound signal can arise as a result of soiling by the tape-cleaning element. However, if the area is larger than the last-mentioned area but smaller than an experimentally determined size the likelihood that the number of errors exceeds the limit value of the maximum number of errors which is still corrigible is reduced considerably in comparison with that in the known system. Therefore, it is already adequate to reduce the dimensions of the tape-cleaning element in such a way that most of the read errors can be corrected by the error correction means.

The size of the area within which all the information on the magnetic tape may be incorrect but can still be corrected completely by the error correction means depends on the error correction system which is used. An error-correction system as used in the DCC system, if the information arranged in n successive information blocks belonging to one information unit is incorrect, will be capable of completely correcting these errors (for more information about the DCC error correction system reference is made to EP 0,437,865 A1, herewith incorporated by reference). Experiments have shown that if the active surface of the tape-cleaning element is smaller than 2 times the length of n information blocks the likelihood of the occurrence of audible errors is reduced considerably in comparison with that in the case of the known tape-cleaning elements.

It is to be noted that from DE 27 14 765 A a magnetic-tape cassette is known per se which comprises a tape cleaning-element which is in contact with the magnetic-tape surface with the free end of a blade-like member.

An embodiment of the system in accordance with the invention is characterized in that the maximum dimension of the active surface of the tape-cleaning element substantially corresponds to the overall longitudinal dimension of n information blocks. The likelihood of incorrect reproduction as a result of soiling is minimized by giving the active surface a maximum width corresponding to the number of fully corrigible information blocks.

An embodiment of the system in accordance with the invention is characterized in that n is six and the dimension of the active surface is smaller than or equal to the overall longitudinal dimension of six information blocks. In this way the width of the active surface is optimized for the error correction system used in the DCC system.

A preferred embodiment of the system in accordance with the invention is characterised in that the longitudinal dimension of six information blocks is approximately 1.0 mm. The maximum distance over which the information may be incorrect to allow full correction by the error correction means is approximately 1.5 millimeters, which corresponds to the length of six information blocks. Thus, in this embodiment the dimension of the tape-cleaning element in a direction parallel to the longitudinal axis of the magnetic tape is slightly smaller than the length of the maximum number of information blocks which can be corrected by the error correction means, so that the number of errors in this area always remains below the limit value of the number of corrigible errors, even if all the information at the location of this area is incorrect. This precludes the occurrence of audible errors in the sound signal as a result of soiling by the tape-cleaning element.

A preferred embodiment of the system in accordance with the invention is characterized in that, viewed perpendicularly to the longitudinal axis of the magnetic tape the tape-cleaning element is substantially V-shaped and the active surface is disposed on the angular portion. The V-shaped construction, preferably with a small radius of the angular portion, produces a favourable action of the active surface.

Yet another embodiment of the system in accordance with the invention is characterized in that the angular portion of the V-shaped tape-cleaning element faces the guide surface of a rotatable tape-guide roller arranged near a corner of the cassette housing and the active surface of the tape-cleaning element resiliently engages against the magnetic tape. In order to guarantee a correct tape transport at the location of the tape guide roller, in addition to a favourable cleaning action of the tape-cleaning element, an embodiment is characterized in that the guide surface is slightly conical and the guide surface is adjoined by a height guide for the magnetic tape, which height guide is intended for guiding a longitudinal edge of the tape perpendicularly to the longitudinal axis of the magnetic-tape guide, the pressure of the active surface on the magnetic tape near the said longitudinal edge of the tape being higher than near the opposite longitudinal edge. If the tape cleaning element exerts a comparatively higher pressure on the magnetic tape near the height guide this provides not only a satisfactory cleaning but also a correct engagement of the longitudinal edge of the magnetic tape against the height guide and, consequently, an accurate guidance of the tape in a plane parallel to a main wall of the cassette housing.

Instead of arranging the tape-cleaning means near tape-guide rollers it is also possible to arrange the tape-cleaning means at another location in the cassette housing. In this respect an embodiment is characterized in that the tape-cleaning means comprises a support which is fixedly connected to the cassette housing, and the active surface is in contact with the magnetic tape in the path followed by the tape between a tape reel and a tape-guide roller arranged near a corner of the cassette housing. This arrangement enables the pressure of the tape-cleaning element on the magnetic tape to be substantially eliminated, which reduces the likelihood of soiling of the tape surface.

A further embodiment of the system in accordance with the invention is characterised in that the tape-cleaning means comprises at least one further tape-cleaning element. Thus, it is possible to allow for a displacement of the point of contact between the tape-cleaning means and the magnetic tape. If as a result of the displacement of the point of contact between the magnetic tape and the tape-cleaning means a tape-cleaning element loses contact with the magnetic tape it is possible to ensure that a further tape-cleaning element comes into contact with the magnetic tape by arranging the further tape-cleaning element at a suitable location. It is also possible for more than one tape-cleaning element of the tape-cleaning means to be in contact with the magnetic tape at the same time. However, in the last-mentioned case allowance is to be made for the fact that errors which may arise as a result of soiling of the magnetic tape by a tape-cleaning element do not occur within the same information unit as the errors caused by the other tape-cleaning element in order to be able to guarantee that the errors resulting from the presence of the tape-cleaning elements cannot lead to audible errors.

In this respect, yet another embodiment is characterized in that the tape-cleaning means with the tape-cleaning elements is situated in the proximity of the circumference of a tape spool and depending on the diameter of the tape spool contacts the circumference of the tape spool with the active surface of the respective tape-cleaning element. This results in a favourable arrangement of the tape-cleaning means in the cassette housing.

The invention also relates to a magnetic-tape cassette, to a tape-cleaning means and to a tape-cleaning element suitable for use in the system in accordance with the invention.

These and other aspects of the invention will be apparent from and explained on the basis of the embodiments described below.

BRIEF DESCRIPTION OF THE DRAWINGS

The invention will now be described in more detail, by way of example, with reference to the drawings. In the drawings.

SUMMARY OF THE INVENTION

Figure 1:
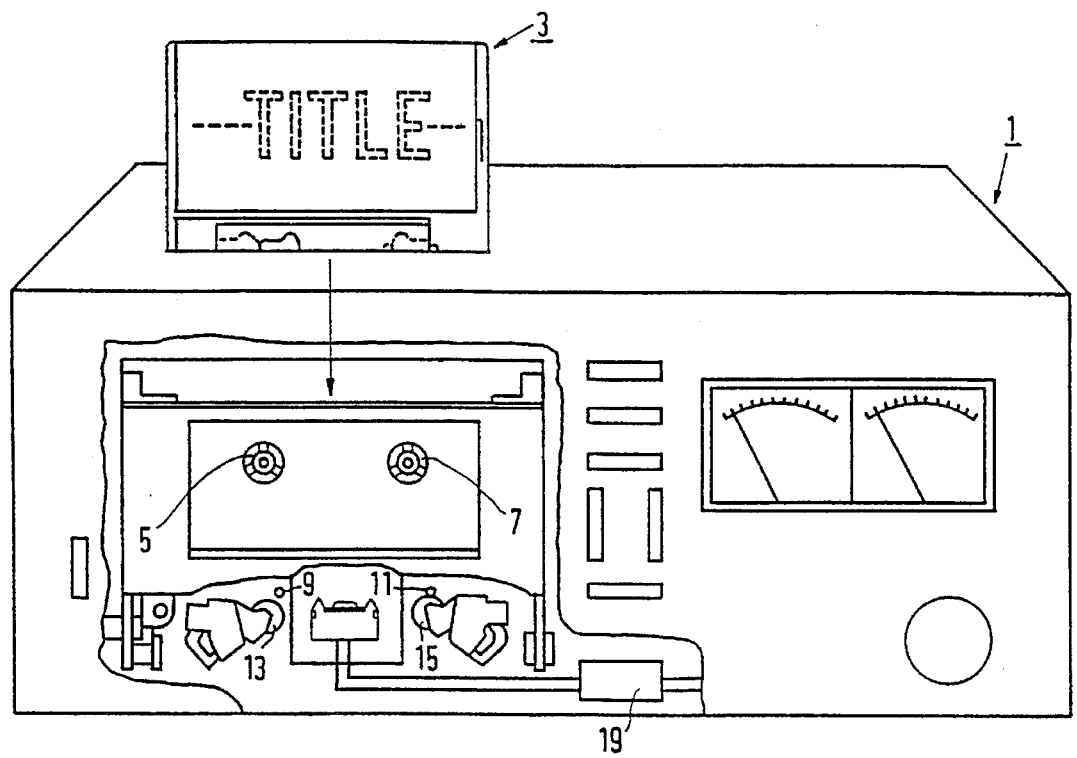
FIG. 1 shows an embodiment of the system in accordance with the invention.

FIG. 1 shows an embodiment of the system in accordance with the invention. The system comprises a magnetic-tape apparatus 1 and a magnetic-tape cassette 3. The magnetic-tape apparatus 1 has reel-drive spindles 5, 7 for rotating the reels in the magnetic-tape cassette for the purpose of winding magnetic tape onto or unwinding it from the reels. The magnetic-tape apparatus further comprises two capstans 9, 11 for moving the magnetic tape with a constant speed past a magnetic head 17 provided in the magnetic-tape apparatus. The capstans cooperate with pressure rollers 13, 15 which press the magnetic tape against the capstans during tape transport by the capstans.

The magnetic head 17 is adapted to write information in digital form on a magnetic tape or to read it from a prerecorded magnetic tape. In addition to digitised audio information the information on the magnetic tape includes information for error-correction purposes. The information is arranged in eight longitudinal tracks. Each track comprises information units arranged after one another in the longitudinal direction. Each information unit comprises 32 information blocks of 510 bits each. If six of the 32 blocks of each information unit contain incorrect information or are read incorrectly these errors can still be corrected completely by error correction means 19 provided in the apparatus. Since the bit rate per track is 96 kilobits per second and the tape transport speed is 4.76 cm/s this means that all the information on the magnetic tape may be read incorrectly over a distance of approximately 1.5 millimeters (to be exact 1.5 1725 millimeters, corresponding to the length of 6 information blocks) and can still be corrected completely.

Figure 2:
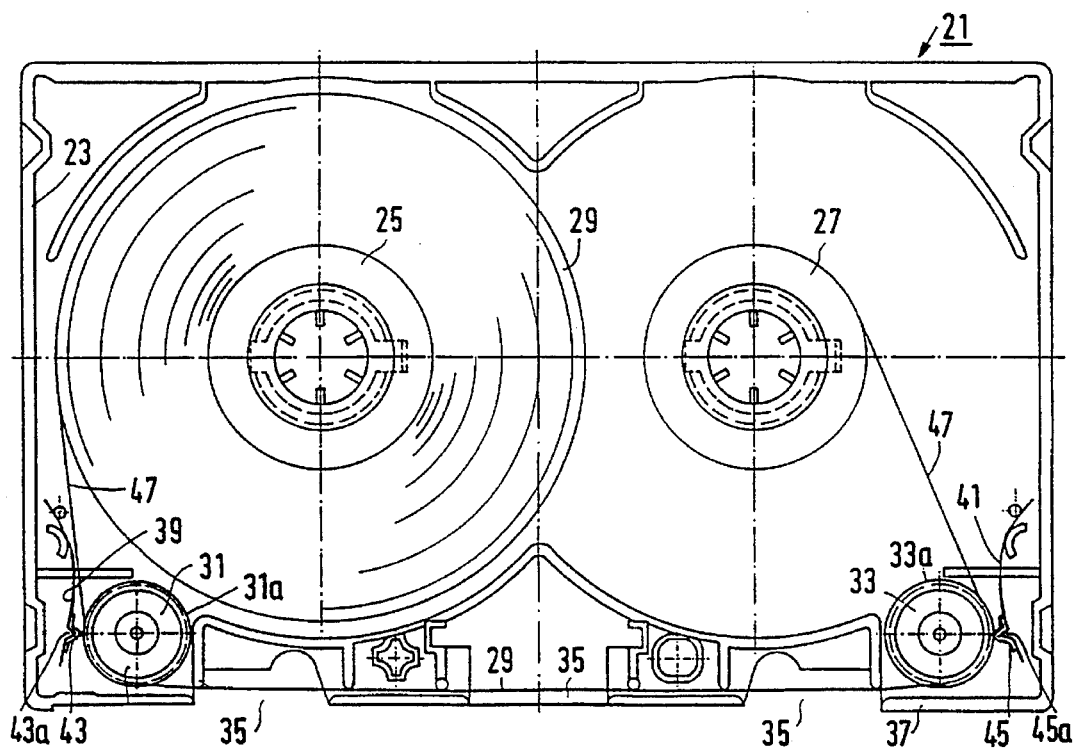
FIG. 2 is a longitudinal sectional view of a first embodiment of a magnetic-tape cassette suitable for use in the system.

FIG. 2 shows a first embodiment of a magnetic-tape cassette 21 suitable for use in the system in accordance with the invention. The magnetic-tape cassette 21 has a housing 23 accommodating two reels 23, 27 on which a magnetic tape 29 is wound. The magnetic-tape cassette 21 further comprises two tape-guide rollers 31, 33 which guide the magnetic tape 29 towards and away from the reels 25, 27 and which guide the magnetic tape 29 along openings 35 in a front wall 37 of the housing 23 of the magnetic-tape cassette. As is shown in FIGS. 2, 3, 4 and 5 tape-cleaning means 39, 41 are arranged near the tape-guide rollers 31, 32 and comprise tape-cleaning elements 43, 45 for cleaning the coating side 47 of the magnetic tape 29. The tape-cleaning elements 43, 45 are arranged on blade springs and each have an active surface 43a, 45a which is pressed against the magnetic tape 29 by these blade springs, the magnetic tape in its turn being pressed against the tape-guide rollers 31, 32. Viewed perpendicularly to the longitudinal axis of the magnetic tape the tape-cleaning elements 43 and 45 are substantially V-shaped, the active surfaces 43a and 45a being disposed on the angular portions. The angular portions of the tape-cleaning elements 43 and 45 face the respective surfaces 31a and 33a of the rollers 31 and 33.

Figure 3:
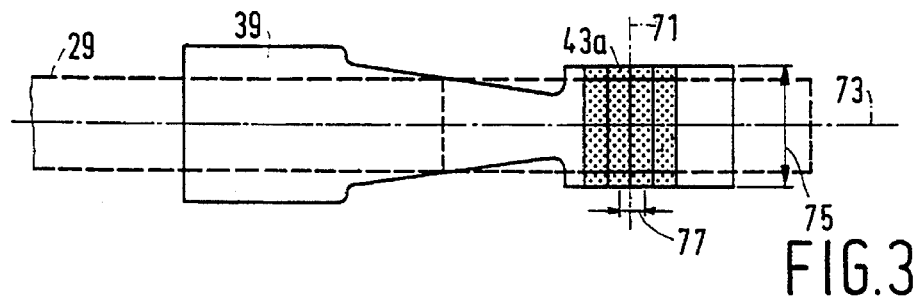
FIG. 3 shows a tape-cleaning means of the magnetic-tape cassette shown in FIG. 2.
Figure 4:
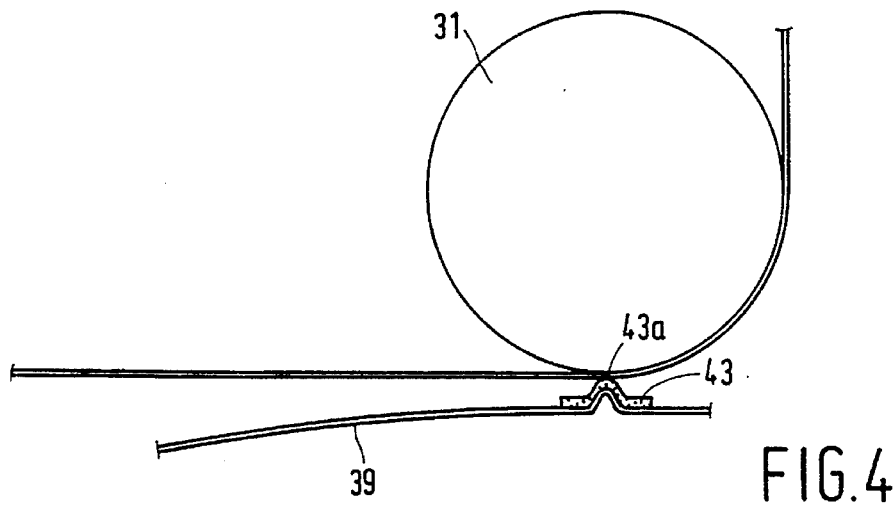
FIG. 4 is a plan of the tape-cleaning means shown in FIG. 3 with the associated tape-guide roller.
Figure 5:
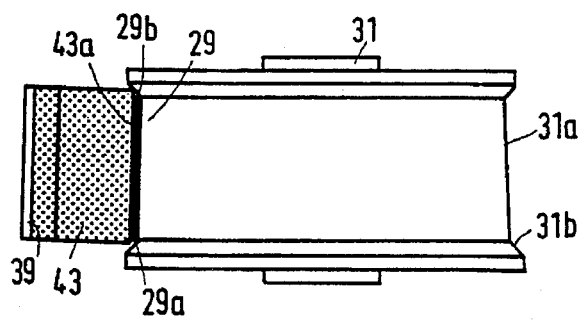
FIG. 5 is a side view of the tape-cleaning means and tape-guide roller shown in FIG. 4, FIG. 6A–6B are longitudinal sectional view of a second embodiment of a magnetic-tape cassette suitable for use in the system, FIGS. 6A and 6B showing different arrangements of a tape-cleaning means.

FIGS. 3, 4 and 5 show the tape-cleaning means 39 of the magnetic-tape cassette 21 shown in FIG. 2. Broken lines in FIGS. 3 and 4 indicate the position of the magnetic tape 29 when the tape-cleaning element is present in the magnetic-tape cassette. The contact area between the active surface 43a of the tape-cleaning element 43 and the magnetic tape 29 extends across the entire width of the magnetic tape and in the longitudinal direction of the magnetic tape it extends over a distance equal to the width of the active surface 43a. The guide surface 31a is slightly conical (FIG. 5). The surface 31a is adjoined by a height guide 31b for guiding the lower edge 29a of the tape 29. As a result of the position of the tape-cleaning element 43 the pressure of the active surface 43a near the lower edge 29a is higher than near the upper edge 29b of the tape. The longitudinal axis 71 of the tape-cleaning element 43 extends perpendicularly to the longitudinal axis 73 of the magnetic tape 29 and the dimension 75 of the element in a direction perpendicular to the longitudinal axis 73 of the magnetic tape is larger than the width of the magnetic tape 29. In a direction parallel to the longitudinal axis 73 of the magnetic tape the active surface 43a has a dimension 77 of approximately 1.0 millimeter. As already explained, this ensures that when the magnetic head reads information from the magnetic tape no errors can arise which result from soiling of the magnetic tape by the tape-cleaning element and which cannot be corrected by the error correction means. To reduce the likelihood of audible read errors it is also possible, as already stated, to make the dimension 77 larger than 1.0 millimeter, but the dimension 77 should then be smaller than 3 millimeters.

Figures 6A, 6B:
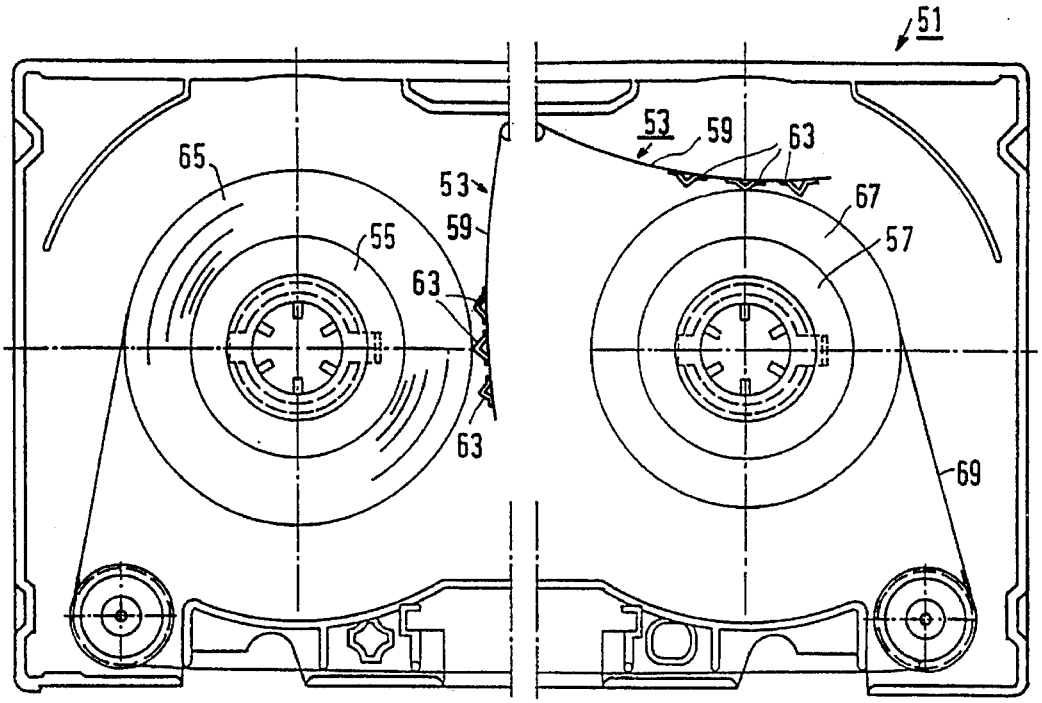

FIGS. 6A and 6B show two examples of a second embodiment of a magnetic-tape cassette 51 suitable for use in the system in accordance with the invention. In FIG. 6A a tape-cleaning means 53 is arranged between and in FIG. 6B above the two reels 55, 57. The tape-cleaning means 53 comprises a blade spring having two limbs 59, each limb carrying three tape-cleaning elements 63. At least one of the tape-cleaning elements 63 on each limb is pressed against the magnetic-tape spool 65, 67 on the reels. Alternatively, more than one tape-cleaning element 63 on a limb may be in contact with the magnetic tape 69.

Figure 7:
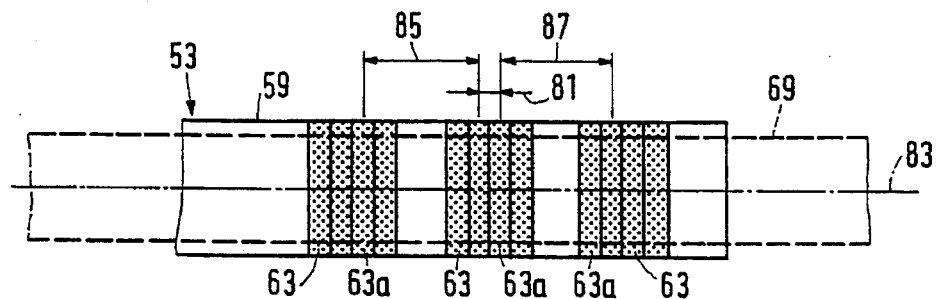
FIG. 7 shows a part of a limb of a tape-cleaning means of the magnetic-tape cassette shown in FIG. 6.

FIG. 7 shows a part of a limb 59 of the tape-cleaning means 53 of the magnetic-tape cassette 51 shown in FIG. 6. Again a broken line indicates the position of the magnetic tape 69 when the tape-cleaning element is present in the magnetic-tape cassette. The limb 59 carries three V-shaped tape-cleaning elements 63. The dimension 81 of these tape-cleaning elements 63 in a direction parallel to the longitudinal axis 83 of the magnetic tape 69 and the distances 85, 87 between the tape-cleaning elements 63 should meet the requirement that for approximately every 8 millimeters length of the magnetic tape 69 (to be exact 8.092 millimeters, corresponding to the length of one information unit or the length of 32 information blocks) the magnetic tape 69 is allowed to be in contact with the active surfaces 63a of the tape-cleaning elements 63 over a maximum length of approximately 1.0 millimeter in order to guarantee that the error correction means can correct errors as a result of soiling of the magnetic tape by the tape-cleaning elements. If this guarantee is not necessary a considerable reduction of the likelihood of the occurrence of audible errors is obtained if the dimension of the active surfaces of the tape-cleaning elements is smaller than 3 millimeters and the distance between these elements is larger than approximately 8 millimeters. The material of the tape-cleaning elements 43, 45, 63 is, for example, a flock material or fleece material of, for example, nylon.

Figure 8:
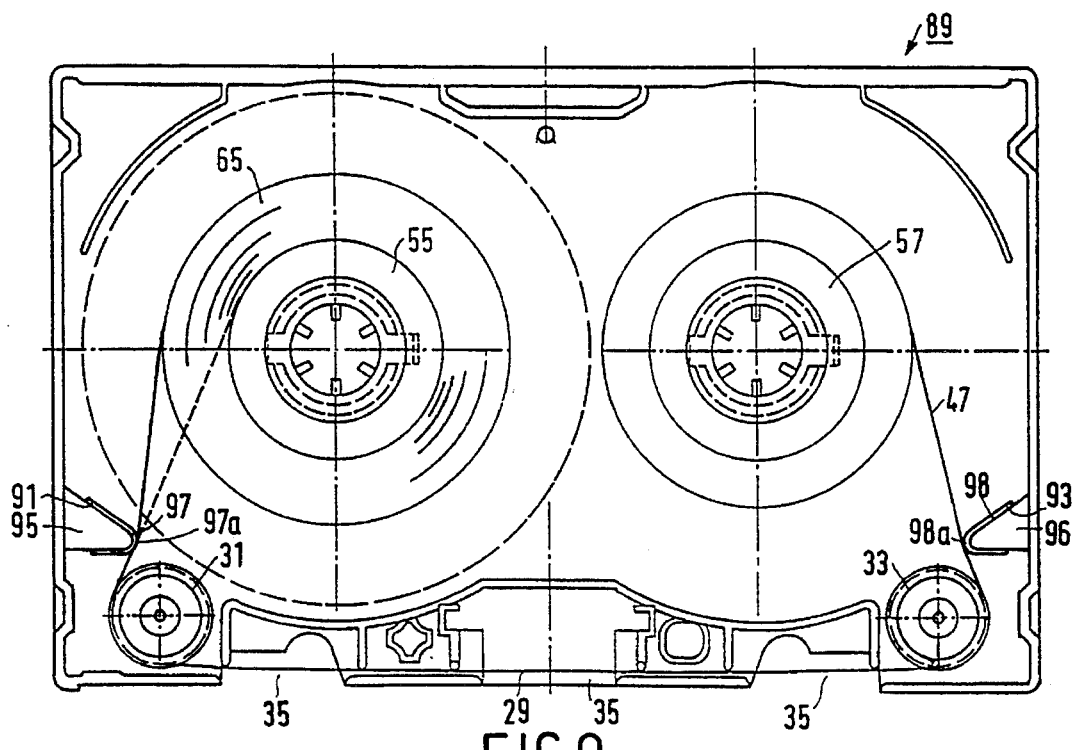
FIG. 8 is a longitudinal sectional view of a third embodiment of a magnetic-tape cassette suitable for use in the system.

FIG. 8 shows a third embodiment of a magnetic-tape cassette 89 suitable for use in the system in accordance with the invention. In this cassette the tape-cleaning means 91 and 93 are disposed on supports 95 and 96 which are fixedly connected to the cassette housing. The tape-cleaning means comprise V-shaped tape-cleaning elements 97 and 98 having active surfaces 97a and 98a, which are in contact with the coating side 47 of the tape 29 in the tape path section between the tape reels 55 and 57. The active surfaces have the same dimensions as in the preceding embodiments.

Although the invention has been described above with reference to the drawings this does not imply that the invention is limited to the embodiments shown in the drawings. The invention likewise relates to all embodiments which deviate from those shown in the drawings within the scope defined by the claims.

We claim:
1. A system, comprising:
   a magnetic-tape cassette comprising a housing, a magnetic tape transportable within said housing, and a tape cleaning element engageable with said magnetic tape; and
   a magnetic-tape apparatus having a magnetic head for communicating information in digital form with the magnetic tape accommodated in the housing of the magnetic-tape cassette, said magnetic-tape apparatus comprising error correction means for correcting errors in the digital information read from the magnetic tape, which information is stored on the magnetic tape in a plurality of parallel longitudinal tracks in successive information blocks in the longitudinal direction of the magnetic tape, the error-correction means being capable of correcting a maximum number of n successive information blocks on the magnetic tape, the dimension of the active surface of the tape-cleaning element in a direction parallel to the longitudinal axis of the magnetic tape is smaller than the overall longitudinal dimension of two times n information blocks, whereby the error correction means is capable of at least substantially correcting read errors which occur as a result of soiling of the magnetic tape over the dimension of the active surface by the tape-cleaning element.

2. A system as claimed in claim 1, characterised in that the maximum dimension of the active surface of the tape-cleaning element substantially corresponds to the overall longitudinal dimension of n information blocks.

3. A system as claimed in claim 2, characterized in that, viewed perpendicularly to the longitudinal axis of the magnetic tape, the active surface engaging the tape is a V-shaped angular portion.

4. A system as claimed in claim 2, characterised in that n is six and the dimension of the active surface is smaller than or equal to the overall longitudinal dimension of six information blocks.

5. A system as claimed in claim 4, characterized in that, viewed perpendicularly to the longitudinal axis of the magnetic tape, the active surface engaging the tape is V-shaped angular portion.

6. A system as claimed in claim 4, characterised in that the longitudinal dimension of six information blocks is approximately 1.0 min.

7. A system as claimed in claim 6, characterized in that, viewed perpendicularly to the longitudinal axis of the magnetic tape, the the active surface engaging the tape is a V-shaped angular portion.

8. A system as claimed in claim 7, characterized in that the tape cassette further comprises a rotatable tape guide roller having a guide surface over which the magnetic tape is guided, and wherein the V-shaped angular portion of the tape-cleaning element faces the guide surface of the rotatable tape-guide roller and resiliently engages against the magnetic tape.

9. A system as claimed in claim 8, characterized in that the guide surface is slightly conical and the guide surface is adjoined by a height guide for the magnetic tape, which height guide guides a longitudinal edge of the tape perpendicularly to the longitudinal axis of the magnetic-tape guide, the pressure of the active surface of the tape cleaning element on the magnetic tape near the said longitudinal edge of the tape being higher than near the opposite longitudinal edge.

10. A system as claimed in claim 7, characterized in that the cassette includes a corner, the tape guide roller is arranged near said corner, the tape-cleaning means comprises a support which is fixedly connected to the casette housing, and the active surface is in contact with the magnetic tape in the path followed by the tape between a tape reel and said tape-guide roller arranged near said corner of the cassette housing.

11. A system as claimed in claim 10, characterised in that the tape-cleaning means comprises at least one further tape-cleaning element.

12. A system as claimed in claim 11, characterized in that the cassette includes a spool on which the tape is wound, and a plurality of tape-cleaning elements are situated in the proximity of the circumference of the tape spool such that the active surface of a respective different tape-cleaning element contacts the tape depending on the diameter of the tape spool as the tape is wound/unwound therefrom.

13. A system as claimed in claim 1, characterized in that the tape-cleaning means comprises at least one further, tape-cleaning element.

14. A system as claimed in claim 1, characterized in that, viewed perpendicularly to the longitudinal axis of the magnetic tape the, the active surface engaging the type is a V-shaped angular portion.

15. A magnetic tape cassette for use with a magnetic tape cassette apparatus having means for reading digital information on a magnetic tape having successive information blocks recorded in longitudinal tracks on the magnetic tape in the longitudinal direction of the magnetic tape and error correction means for correcting a maximum number of n successive information blocks in the digital information read from the magnetic tape, wherein said cassette comprises:

a housing;

a tape reel rotatable within said housing;

a length of magnetic tape wound on said tape reel and transportable within said housing; and a tape cleaning element within said housing resiliently biased against said magnetic tape, said tape cleaning element having an active surface in contact with said tape, the dimension of the active surface in the longitudinal direction of the magnetic tape being smaller than the overall longitudinal dimension of two times n information blocks.

16. A magnetic tape cassette as claimed in claim 15, wherein the maximum dimension of the active surface of the tape-cleaning element substantially corresponds to the overall longitudinal dimension of n information blocks.

17. A magnetic tape cassette as claimed in claim 16, wherein n is six and the dimension of the active surface is smaller than or equal to the overall longitudinal dimension of six information blocks.

18. A magnetic tape cassette as claimed in claim 17, wherein that the longitudinal dimension of six information blocks is approximately 1.0 mm.

19. A magnetic tape cassette as claimed in claim 18, wherein, viewed perpendicularly to the longitudinal axis of the magnetic tape, the active surface engaging the tape is a V-shaped angular portion.

20. A magnetic tape cassette according to claim 19, comprising a plurality of said tape cleaning elements, said tape cleaning elements being arranged near said tape reel such that, as the tape is unwound from said reel and the diameter of said tape on said reel is reduced, a respective different tape element engages said tape.

21. A magnetic tape cassette according to claim 19, comprising a plurality of said tape cleaning elements, said tape cleaning elements being arranged near said tape reel such that, as the tape is unwound from said reel and the diameter of said tape on said reel is reduced, a respective different tape element engages said tape.

22. A magnetic tape cassette, comprising:

a housing;

a rotatable tape reel within said housing;

a length of magnetic tape wound on said tape reel said tape including a broad face and opposing longitudinal side edges;

a tape guide in said housing over which said tape is guided, said tape guide including a slightly conical portion engaged by the broad face of said tape and an adjoining height guide for guiding the side edge of said tape; and a tape cleaning element biasing said tape against said tape guide, said tape cleaning element being arranged such that it exerts a higher pressure on said tape near said side edge engaging said height guide than on said tape near said opposing side edge.

* * * * *